KUENNE, COLE & RATH.
Horse Power.
No. 40,267. Patented Oct. 13, 1863.
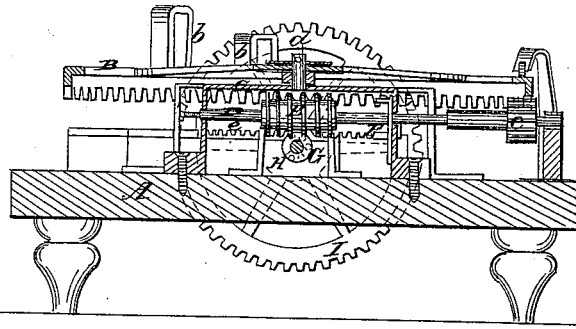
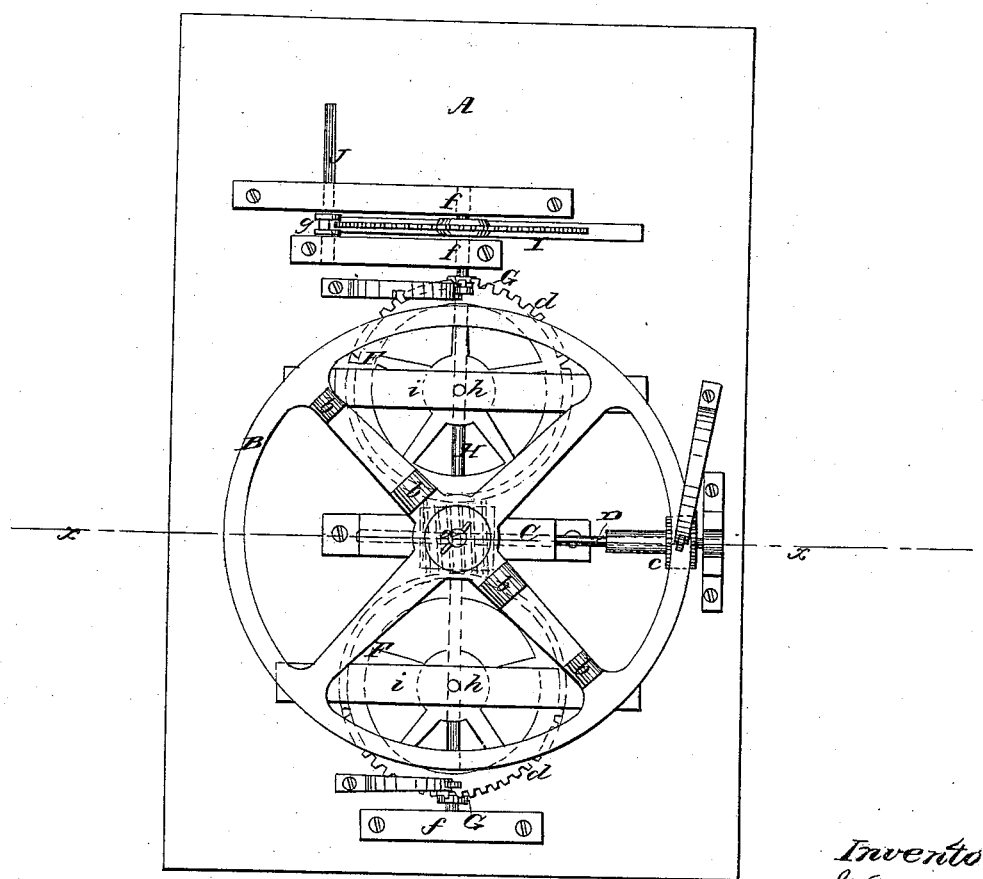

UNITED STATES PATENT OFFICE.

G. KUENNE, J. N. COLE, AND D. F. RATH, OF FOND DU LAC, WISCONSIN.

IMPROVEMENT IN HORSE-POWERS.

Specification forming part of Letters Patent No. 40,267, dated October 13, 1863.

*To all whom it may concern:*

Be it known that we, G. KUENNE, J. N. COLE, and D. F. RATH, of Fond du Lac, in the county of Fond du Lac and State of Wisconsin, have invented a new and Improved Horse-Power; and we do hereby declare that the following is a full, clear, and exact description of the same, reference being had to the accompanying drawings, making a part of this specification, in which—

Figure 1 is a side sectional view of our invention, taken in the line *x x*, Fig. 2; Fig. 2, a plan or top view of the same.

Similar letters of reference indicate corresponding parts in the two figures.

This invention consists in combining the screw, lever, and wheel in such a manner as to form a simple, durable, and economical horse-power.

To enable those skilled in the art to fully understand and construct our invention, we will proceed to describe it.

A represents a bed-piece or framing which supports the working parts of the device, and B is a master or driving wheel, which is provided with teeth at the lower edge of its periphery, said wheel being in a horizontal position and fitted on an axis, *a*, which is secured to a bridge, C, firmly attached to the bed-piece A. The wheel B has loops or sockets *b* attached to its upper surface to receive the sweeps to which the horses or other animals are attached, one or more sweeps being used, as may be desired.

In the bridge C there is fitted a shaft, D, having a screw, E, upon it. The shaft D extends through one side of the bridge, and has a pinion, *c*, upon it, into which the wheel B gears. The screw E gears into two worm-wheels, F F, which have each two sets of teeth, one set, *d*, gearing into the screw E, and the other set, *e*, which depends from the wheels F, gearing into pinions G G, which are on a shaft, H, the latter having its bearings *f* attached to the bed-piece A. On one end of the shaft H there is also secured a wheel, I, which gears into a pinion, *g*, on a shaft, J, from which the power is taken. The axles *h* of the wheels F F are fitted in proper bearings, *i*, attached to the bed-piece.

The operation is follows: As the wheel B is rotated by the animals, motion is communicated to the shaft D by means of the pinion *c*, into which the wheel B gears, and the screw E on shaft D rotates the two wheels F F, which give motion to the shaft K through the medium of the pendent teeth *e* and pinions G G, and the wheel I and pinion *g*, communicate motion from the shaft H to the shaft J.

The whole arrangement is extremely simple, compact, and efficient, and the power of the animals is transmitted to the machinery to be driven with but little loss from friction, while a requisite degree of speed is given the machinery.

Having thus described our invention, what we claim as new, and desire to secure by Letters Patent, is—

The combination of the master or driving wheel B, screw E, and pinion *c* on shaft D, wheels F F, provided with two sets of teeth, *d e*, and the pinions G G on the shaft H, and with or without the wheel I and pinion *g*, for communicating motion to shaft J, all arranged substantially as and for the purpose herein set forth.

G. KUENNE.
J. N. COLE.
D. F. RATH.

Witnesses:
JOHN H. GORES,
EDWARD BISSELL.